United States Patent Office 3,788,945
Patented Jan. 29, 1974

3,788,945
PROCESS FOR ISOMERIZING GLUCOSE
TO FRUCTOSE
Kenneth N. Thompson, Richard A. Johnson, and Norman E. Lloyd, Clinton, Iowa, assignors to Standard Brands Incorporated, New York, N.Y.
No Drawing. Filed Nov. 9, 1970, Ser. No. 88,190
Int. Cl. C07g 7/02; C13k 9/00
U.S. Cl. 195—31 F                19 Claims

ABSTRACT OF THE DISCLOSURE

The disclosure is directed to a process of enzymatically converting glucose to fructose. A glucose-containing solution is passed, under specific conditions, through a bed of glucose isomerase bound to an inert carrier.

THE INVENTION

This invention relates to a process of enzymatically converting a portion of the glucose in a glucose-containing solution to fructose.

There are many processes known in the art for producing fructose-containing solutions. These processes may be grouped into three broad categories. In the first category, sucrose is inverted to glucose and fructose by the use of an acid or invertase.

In the second category, glucose is converted to fructose by the use of alkaline catalysts. There are many papers and patents which disclose various alkaline catalysts and the use thereof for converting glucose to fructose. Exemplary of processes using alkaline catalysts are those disclosed, for instance, in U.S. Pat. 2,487,121 to Fetzer et al.; U.S. Pat. 2,746,889 to Langlois et al.; U.S. Pat. 2,354,664 to Cantor et al.; U.S. Pat. 3,285,776 to Scallet et al.; U.S. Pat. 3,383,245 to Scallet et al. and U.S. Pat. 3,305,395 to Scallet et al. However, there are a number of distinct disadvantages associated with alkaline isomerization. For instance, due to the non-selectivity of the alkaline catalysts various objectionable by-products are formed, such as large amounts of colored bodies and acidic materials. To refine alkaline-isomerized liquors to remove the objectionable by-products to produce an acceptable product requires rather complicated and costly procedures.

The third category for producing frustose-containing solutions involves enzymatically converting glucose in a glucose-containing solution, e.g., corn syrup, to fructose. Various microorganisms are known in the art which produce glucose isomerase. For example, in an article appearing in Science, vol. 125, pp. 648–9 (1957), it is disclosed that an enzyme derived from *Pseudomonas hydrophila* will isomerize glucose to fructose. Also, British Pat. 1,103,394 and Japanese Pat. 7,428 (1966) to Takasaki et al. disclose that microorganisms classified as belonging to the Streptomyces genus, such as *Streptomyces flavovirens*, *Streptomyces achromogenes*, *Streptomyces echinatus* and *Streptomyces albus*, produce glucose isomerase. There are many other microorganisms which are disclosed in the art as producing glucose isomerase. A few of the other microorganisms disclosed are, for instance, *Aerobacter cloacae*, *Bacillus megaterium*, *Acetobacter suboxydans*, *Acetobacter melanogenus*, *Acetobacter roseus*, *Acetobacter oxydans*, *Bacillus fructose* and *Lactobacillus fermenti*.

Because of the economics involved in producing glucose isomerase, it is of the utmost importance to use the isomerase under conditions whereby maximum yields of fructose are produced using minimum quantities of glucose isomerase. Moreover, the conditions for isomerization should be such that minimal quantities of objectionable by-products are produced.

Glucose isomerase is produced primarily intracellularly by the above microorganisms. Thus, the major portion of the glucose isomerase is found within and/or on the cell walls of the microorganisms. Normally when these cells are used to isomerize glucose to fructose, the isomerase during isomerization is released or is extracted therefrom. When the isomerase is released or extracted from the cells it is essentially solubilized. It would involve a rather costly and complicated procedure to recover the solubilized isomerase so that it can be used in another isomerization reaction.

In an article entitled "A Continuous Glucose Isomerization Method by an Adsorbed Enzyme Column" by Tsumura et al., published in Nippon Shokuhin Kogyo Gakkaishi, 14 (12), 1967, glucose isomerase derived from *Streptomyces phaechromogenes* was bound to DEAE-Sephadex. This bound enzyme was placed in a column and a glucose solution was continuously passed therethrough. As the glucose contacted the bound enzyme, fructose was continuously produced. Although the process disclosed in this article apparently presents a partial solution to the problem of reusing glucose isomerase, it was conducted on such a small scale that the processing parameters are not applicable to commercial practice. It would therefore be difficult, if not substantially impossible, to reduce this process to commercial scale and produce a glucose-fructose-containing solution of acceptable quality.

Therefore, it is the principal object of the present invention to provide a continuous process for commercially enzymatically isomerizing glucose to fructose.

This object and other objects of the present invention may be attained in accordance with the present invention by forming a glucose-containing solution having a viscosity of from about 0.5 to about 100 centipoises, a pH in the range of from about 6 to about 9 and containing from about 5 to about 80 percent glucose by weight; heating said solution to a temperature in the range of from about 20° to about 80° C. and passing the solution through a bed containing bound glucose isomerase having a glucose isomerase activity of at least 3 IGIU per cubic centimeter of bed and a stability value of at least 50 hours, thereby converting up to about 54 percent of the glucose to fructose. The flow rate of the glucose-containing solution passing through the bed should be such that the color of the solution exiting the bed is increased by less than 2 color units and there is no substantial production of psicose.

Various terms and expressions used in the foregoing and the following discussion and examples are defined as follows:

STABILITY VALUE

The stability value is determined by placing a sufficient amount of the bound glucose isomerase in a column to obtain from 1000 to 4000 IGIU therein. A solution that is 3 molar in glucose, at a pH of 6.5, 0.001 molar in $CoCl_2$ and 0.005 molar in $MgSO_3$ is passed through the column at a rate of from 10 to about 200 ml./hr. The column is maintained at a temperature of 60° C. The fraction of glucose converted to fructose in the effluent is determined after 4 hours to insure that the bed of bound glucose isomerase is under equilibrium conditions. The activity index of the bound glucose isomerase is calculated using the following formula:

Activity index $= (R/E) \log (0.504/(0.504-I))$ where I is the fraction of glucose converted to fructose, R is the flow rate (ml./hr.) and E is the number of IGIU initially in the column.

The activity index is determined periodically and the time it takes for the activity index to reach one-half the initial value (value after 4 hours) is the stability value in hours.

COLOR UNITS

Color was determined spectrophotometrically by measuring the absorbance at 450 mμ and 600 mμ of an appropriately diluted liquor in a 1-cm. cell versus water as a reference. The spectrophotometer was a Beckman DK-2A, manufactured by Beckman Instrument Company. The color was calculated by using the following formula:

$$\text{Color units} = \frac{(109)(A_{450} - A_{600})}{C}$$

$A_{450}$=absorbance at 450 mμ
$A_{600}$=absorbance at 600 mμ
$C$=concentration (g./100 ml.).

FRUCTOSE CONTENT OF ISOMERIZING LIQUOR

Fructose content of the isomerized liquor was determined by measuring the change in specific rotation which occurred during isomerization. Specific rotations were measured using a Bendix Corporaiton NPL Model 969 Automatic Polarimeter. The rotations were determined at a concentration of 2.5 g./100 ml. in a glass cell thermostated at 25° C. The path of the cell was 50 mm. The specific rotations were determined at the beginning of the isomerization reactions after all ingredients in the glucose-containing solutions had been combined. To determine change in fructose content the specific rotation of the isomerized liquor was determined. Change in fructose content was calculated by using the following formula:

$$\text{Percent fructose} = \frac{100(A_1 - A_0)}{-138.9}$$

$A_1$=specific rotation of isomerized liquor
$A_0$=specific rotation of glucose-containing solution before isomerization.

In the formula, the factor −138.9 is the change in specific rotation which occurs when glucose is converted completely to fructose.

IGIU

IGIU is the abbreviation for International Glucose Isomerase Unit and is that amount of enzyme which will convert 1 micromole of glucose to fructose per minute in a solution initially containing 2 moles of glucose per liter, 0.02 mole of $MgSO_4$ per liter and 0.001 mole of $CoCl_2$ per liter at a pH of 6.84 to 6.85 (0.2 M sodium maleate) and a temperature of 60° C.

The process of the present invention provides a number of distinct advantages. For example, it provides a process which can easily and economically be performed in a commercial operation. Furthermore, it is extremely efficient in respect to the utilization of the glucose isomerase and the production of a glucose-fructose syrup containing minimal color, ash and psicose. Moreover, the isomerization reaction may be performed continuously which, of course, is a distinct advantage in any manufacturing operation.

The characteristics of the glucose-containing solution is somewhat important in determining the exact conditions under which the isomerization reaction is performed. There are many methods known in the art for the production of glucose-containing solutions. For instance, the methods which are currently being practiced commercially principally involve saccharifying cornstarch into glucose. These methods may be grouped into three categories. The first is an acid process in which a dilute acid solution is used to hydrolyze starch to glucose. The second is an acid-enzyme process in which starch is liquefied by a mild acid treatment and then an enzyme is used to convert the liquefied starch to glucose. The third is an enzyme-enzyme process in which two enzyme treatments are used, the first to liquefy the starch and the second to convert the liquefied starch to glucose. In the process of the present invention, it is preferred to use a glucose-containing solution produced by either of the latter two processes since such solutions, generally, contain greater amounts of dextrose on a dry substance weight basis, lesser amounts of acids, less color and lower amounts of oligosaccharides. The glucose-containing solution may be refined if desired by conventional means prior to its being subjected to the process of the present invention.

The viscosity of the glucose-containing solution should be in the range of from about 0.5 to about 100 centipoises and preferably should be from about 2 to about 20 centipoises. If the viscosity of the solution is too high, the pressure required to pass the solution through the bed will be unreasonably high. Reducing the pressure results in reduction of flow rates so that the time that the solution is in contact with the bound isomerase may be too long to make effective use of the enzyme. Also, because the length of time that the solution is maintained under isomerization conditions, e.g., temperature, pH, etc., may be excessive, there is the likelihood that an undesirable amount of color and psicose would be produced.

The concentration of glucose in the glucose-containing solution should be in the range of from about 5 to about 80 percent by weight and preferably should be in the range of from about 40 to about 60 percent on the same weight basis.

The pH of the glucose-containing solution should be in the range of from about 6 to about 9, preferably from about 6.5 to about 8 and most preferably from about 7 to about 7.5. It is important to maintain the pH of the glucose-containing solution within this range during the isomerization reaction since if the solution is outside this range the isomerase will be quickly inactivated and/or large amounts of unwanted by-products such as color and psicose will be produced. In the glucose-containing solution there may be various metal ion activators and/or stabilizers for the isomerase, such as soluble salts of cobalt, magnesium, etc.

The characteristics of the bed of the bound glucose isomerase are extremely important in respect to the quality of the fructose-glucose solution produced and the commercial utilization of the present process. The bed should contain at least 3 IGIU of glucose isomerase activity per cubic centimeter and perferably contain at least 20 IGIU per cubic centimeter. If the bed contains less than 3 IGIU of glucose isomerase activity per cubic centimeter a greater bed volume may be necessary to isomerize equivalent amounts of dextrose. This may present various attendant problems such as greater pressure drops across the bed, longer contact times between the glucose-containing solution and the isomerase to produce the desired fructose and greater capital expense because of the size of the equipment needed to contain the bed of bound isomerase. Furthermore, as the depth of the bed is increased there is a greater tendency for compaction of the bed due to the high pressures which must be employed to pass the glucose-containing solution therethrough. For example, in a relatively shallow bed, the bed can only compact to a small extent while in a bed of greater depth the compaction can be much greater. When this occurs, the pressure drop across the bed will increase to such as extent that the pressure necessary to pass the glucose solution through the bed may be extraordinarily high, and may be so high that conventionally constructed equipment can not be used to contain the bed.

The stability value of the bound glucose isomerase should be at least 50 hours, preferably at least about 300 hours and most preferably at least 400 hours.

Forming the bound glucose isomerase may be accomplished in any convenient manner so long as the bound glucose isomerase has the characteristics set forth above. It is contemplated that glucose isomerase may be bound to a host of inert carriers. For instance, glucose isomerase may be bound to DEAE-cellulose(diethylaminoethyl cellulose) or like material and excellent results will be obtained. Of course, to effectuate binding the glucose isomerase must be removed from the cells and there must be no interfering substances present during binding. The binding may be accomplished in an aqueous medium or in a sugar solution, e.g., corn syrup. Also the glucose isomerase may be bound within inert carriers either along with cellular material or in the relatively pure state. Various polymeric materials may be suitable for this purpose but of course tne porosity of such materials must be such that allows the glucose to contact the glucose isomerase.

When the isomerase is bound to a finely divided carrier such as DEAE-cellulose, it is preferred that the present process be performed by passing the glucose-containing solution through a relatively shallow bed of the same. For instance, it is contemplated that the depth of the bed of the bound glucose isomerase will be in the range of from a fraction of an inch to about 5 inches. The cross sectional area of the bed, however, will be large. It is preferred that the ratio of the depth to the width of the bed be in the range of from about 0.01 to 0.1 and most preferably be in the range of from about 0.02 to about 0.05. This provides the advantages that the pressure drop across the bed is small and that compaction of the bed will be minimal. However, since the bed is relatively shallow, there is a greater tendency of channeling to occur. Channeling results in inefficient use of the glucose isomerase. If at least two beds, preferably at least six beds, of bound glucose isomerase are positioned in series and there is provision made for mixing the effluent from a previous bed before it is passed through a subsequent bed, any channeling which might occur would not have a serious effect on the efficiency of the present process.

An apparatus known in the art which can be used for this purpose is a pressure leaf filter. The pressure leaf filter comprises an assembly of flat filtering elements (leaves) supported vertically or horizontally in a cylindrical tank. The leaves may be circular or rectangular and have filtering surfaces on both sides. The cylindrical tank may have its long axis horizontal or vertical. A filter leaf may consist of a heavy screen or grooved plate over which a filter medium such as woven fabric or fine wire cloth is fitted. The glucose isomerase bound to an inert carrier may be slurried in a glucose-containing solution and this slurry pumped through the pressure leaf filter in such a manner as to cover each leaf evenly with the bound enzyme. The pressure applied to the solution will hold, in the case of a vertical pressure leaf filter, the bound glucose isomerase to the leaves. A glucose-containing solution may then be pumped through the pressure leaf filter and while it passes through each bed of bound glucose isomerase, isomerization will occur. The amount of fructose formed will be dependent upon the period of time that the glucose solution is in contact with the bound enzyme.

The exact composition of the isomerized glucose-containing solution will vary depending upon the conditions under which the present process is performed. In Table I below the essential characteristics of isomerized glucose-containing solutions produced by the present invention are shown.

TABLE I.—CHARACTERISTICS OF UNREFINED FRUCTOSE CONTAINING SOLUTIONS

| | [Percent dry basis] | | | | | |
| --- | --- | --- | --- | --- | --- | --- |
| | Glucose[1] | Fructose[1] | Polysaccharide[1] | Psicose | Ash[2] | Color units |
| Typical range | 30-60 | 10-54 | 0-50 | 0-1 | 0.1-0.5 | 0-2.0 |
| Preferred range | 30-60 | 10-54 | 0-30 | 0-0.5 | 0.1-0.2 | 0-0.05 |
| Most preferred range | 30-60 | 10-54 | 0-30 | 0-0.1 | 0.05-0.1 | 0-0.03 |

[1] Amount of saccharide principally dependent on the product desired.
[2] Principally composed of metallic salts which are present during isomerization to stabilize and/or activate the glucose isomerase.

In order to more clearly describe the nature of the present invention, specific examples will hereinafter be described. It should be understood, however, that this is done solely by way of example and is intended neither to delinate the scope of the invention nor limit the ambit of the appended claims.

EXAMPLE I

This example illustrates the use of glucose isomerase bound on DEAE cellulose to continuously convert glucose to fructose.

Streptomyces sp. ATCC 21175 was grown under submerged aerobic conditions and then separated from the fermentor broth by filtration. One kilogram of filter cake was slurried in 5 liters of deionized water to which was added 50 ml. of 0.1 M $CoCl$, and 8 g. of a cationic detergent (Arquad 18-50, Armour Industrial Chemical Co.). The temperature of the slurry was maintanied at 60° C., and the pH was maintained at 6.7–6.8. After 3.75 hours of stirring, the slurry was filtered under vacuum through Whatman #1 filter paper. The filtrate was concentrated by evaporation under vacuum to 30 IGIU/ml.

Five hundred milliliters of the concentrated filtrate was diluted to 1500 ml. with deionized water. Five grams of DEAE-cellulose (Cellex-D manufactured by Bio-Rad Laboratories) was added to the filtrate, stirred one-half hour and filtered through Whatman #1 filter paper on a vacuum filter. The filter cake was washed with water while still on the filter and the washings were collected with the filtrate. The filter cake contained mostly non-isomerase material. The purified filtrate contained 9.2 IGIU/ml.

Thirty grams of DEAE cellulose was suspended in 1500 ml. of water, stirred vigorously and the suspension allowed to set for 30 to 45 minutes. The supernatant suspension was decanted to remove the DEAE-cellulose "fines." This was repeated four times and then the suspension was filtered under vacuum. Twenty grams (dry basis) of the DEAE cellulose filter cake were added to the purified filtrate containing 9.2 IGIU/ml. and stirred for one-half hour at room temperature. The suspension was filtered and a moist filter cake comprising the DEAE-cellulose with the isomerase absorbed thereon was recovered. The moist filter cake contained 215 IGIU/g. 6.25 g. of the moist filter cake was slurried in 50 ml. of an aqueous solution containing 0.001 mole of $CoCl_2$ per liter, 0.005 mole of $MgSO_3$ per liter and 0.1 mole of NaCl per liter. This slurry was poured into a column having a diameter of 1 cm. and allowed to settle. The bottom portion of the column contained a shallow layer of glass wool to retain the DEAE-cellulose. The bottom outlet of the column was opened and when the bed height of the DEAE-cellulose was 25 cm., 350 ml. of an aqueous solution containing 0.001 mole of $CoCl_2$ per liter, 0.005 mole of $MgSO_3$ per liter and 0.1 mole of NaCl per liter passed through the bed to remove colored materials and other impurities from the DEAE-cellulose.

A glucose solution at a pH of 6.5 containing 3 moles of glucose per liter, 0.001 mole of $CoCl_2$ per liter and 0.005 mole of $MgSO_3$ per liter was passed through the column at a rate of 0.2 ml./min. The temperature of the column was maintained at 60° C. The conversion of glucose to fructose after 6 hours was 49.6 percent and after 186 hours was 45.0 percent. The stability value was 198 hours.

EXAMPLE II

This example illustrates the use of glucose isomerase bound to a porous synthetic anion-exchange resin to continuously convert glucose to fructose.

Glucose isomerase was removed from the cells of Streptomyces sp. ATCC 21175 and purified in the manner described in Example I.

One hundred grams of Amberlite IRA–938 (Rohm & Haas) were placed in a column having a diameter of 2.6 cm. The bed height of the Amberlite IRA–938 was 37 cm. The column was maintained at 60° C. The column was treated by passing through, in sequence, 500 ml. of 1.5 N NaOH, 1000 ml. of deionized water, 1000 ml. of 2 M HCL, and 1000 ml. of deionized water. To 1480 ml. of a partially purified solution of glucose isomerase purified according to Example I at a temperature of 50° C. were added 100 g. of Amberlite IRA–938. The solution was stirred for two hours and then filtered. The filtrate was percolated through the bed of Amberlite IRA–938 at a rate of 3 ml./min. The bed was then washed with 100 ml. of deionized water. The bed contained 3430 IGIU.

A glucose-containing solution at a pH of 6.5 containing 3 moles of glucose per liter, 0.001 mole of $CoCl_2$ per liter and 0.005 mole of $MgSO_3$ per liter was passed through the bed at a rate of 3.6 ml./min. The temperature of the column was maintained at about 60° C. The degree of conversion of glucose to fructose was 21.9 percent after the column had been operating for 41 hours and was 19.5 percent at 210 hours. The stability value was estimated at about 600 hours.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:

1. A process of enzymatically converting glucose to fructose which comprises forming a glucose-containing solution having a viscosity of from about 0.5 to about 100 centipoises, a pH in the range of from about 6 to about 9 and containing from about 5 to about 80 percent glucose by weight; maintaining said solution at a temperature of from about 20° to about 80° C., while passing said solution through a bed of bound glucose isomerase selected from the group consisting of glucose isomerase bound to anion exchange cellulose and glucose isomerase bound to a synthetic anionic exchange resin having a glucose isamerase activity of at least 3 IGIU per cubic centimeter of bed and a stability value of at least 50 hours at a flow rate whereby up to about 54 percent of glucose is converted to fructose, the color of the converted solution is increased by less than 2 color units and there is no substantial production of psicose.

2. A process of enzymatically converting glucose to fructose as defined in claim 1, wherein the viscosity of the glucose-containing solution is from about 2 to about 20 centipoises and the pH of the solution is from about 6.5 to about 8.

3. A process of enzymatically converting glucose to fructose as defined in claim 2, wherein the glucose-containing solution contains from about 40 to about 60 percent glucose by weight and the pH of the solution is from about 7 to about 8.

4. A process of enzymatically converting glucose to fructose as defined in claim 2, wherein the bed of bound glucose isomerase contains at least 20 IGIU per cubic centimeter of bed.

5. A process of enzymatically converting glucose to fructose as defined in claim 4, wherein the stability value of the bound glucose isomerase is at least 300 hours.

6. A process of enzymatically converting glucose to fructose as defined in claim 4, wherein the stability value of the bound glucose isomerase is at least 400 hours.

7. A process of enzymatically converting glucose to fructose as defined in claim 1, wherein the glucose isomerase is bound to DEAE cellulose.

8. A process of enzymatically converting glucose to fructose as defined in claim 7, wherein the bed has a depth to width ratio in the range of from about 0.01 to about 0.1.

9. A process of enzymatically converting glucose to fructose as defined in claim 2, wherein the bed has a depth to width ratio in the range of from about 0.02 to about 0.05.

10. A process of enzymatically converting glucose to fructose as defined in claim 9, wherein the glucose containing solution is passed through at least 2 beds of the bound glucose isomerase which are positioned in series.

11. A process of enzymatically converting glucose to fructose as defined in claim 5, wherein the glucose-containing solution passed through the bed is produced by treating starch with an acid to liquefy the starch and then treating the liquefied starch with a glucose-forming enzyme to obtain the glucose-containing solution.

12. A process of enzymatically converting glucose to fructose as defined in claim 5, wherein the glucose-containing solution passed through the bed is produced by treating starch with an enzyme to liquefy the starch and then treating the liquefied starch with a glucose-forming enzyme to obtain the glucose-containing solution.

13. A process of enzymatically converting glucose to fructose as defined in claim 10, wherein the glucose-containing solution is passed through at least 6 beds positioned in series.

14. A process of enzymatically converting glucose to fructose as defined in claim 5, wherein the glucose isomerase is derived from Streptomyces ATCC 21175.

15. A process of enzymatically converting glucose to fructose as defined in claim 1, wherein the glucose-containing solution is passed through the bed of bound glucose isomerase at a flow rate whereby up to 1 percent psicose is produced.

16. A process of enzymatically converting glucose to fructose as defined in claim 15, wherein the glucose-containing solution is passed through the bed of bound glucose isomerase at a flow rate whereby up to 0.5 percent psicose is produced.

17. A process of enzymatically converting glucose to fructose as defined in claim 16, wherein the glucose-containing solution is passed through the bed of bound glucose isomerase at a flow rate whereby up to 0.1 percent psicose is produced.

18. A process of enzymatically converting glucose to fructose as defined in claim 16, wherein the glucose-containing solution is passed through the bed of bound glucose isomerase whereby the color of the converted solution is increased by less than 0.05 color unit.

19. A process of enzymatically converting glucose to fructose as defined in claim 17, wherein the glucose-containing solution is passed through the bed of bound glucose isomerase whereby the color of the converted solution is increased by less than 0.03 color unit.

References Cited

UNITED STATES PATENTS

| | | | |
|---|---|---|---|
| 3,708,397 | 2/1973 | Sipos | 195—31 F |
| 3,282,702 | 11/1966 | Schreiner | 195—63 |
| 3,623,953 | 11/1971 | Cotter et al. | 195—31 F |

OTHER REFERENCES

Tsumura et al.: Chem. Abs., vol. 60, #64824d, 1968.

Takasaki et al.: Ferm. Adv., pp. 561–89, Academic Press, 1969.

Mitz et al.: J. Am. Chem. Soc., vol. 81, pp. 4024–8, 1959.

Kay, G.: Process Biochem., pp. 36–39, 1968.

LIONEL M. SHAPIRO, Primary Examiner

U.S. Cl. X.R.

195—63, DIG. 11

UNITED STATES PATENT OFFICE
CERTIFICATE OF CORRECTION

Patent No. 3,788,945          Dated January 29, 1974

Inventor(s) Kenneth N. Thompson et al.

It is certified that error appears in the above-identified patent and that said Letters Patent are hereby corrected as shown below:

1) Column 2, line 16; "phaechromogenes" should read --phaeochromogenes--.

2) Column 3, line 22; "Corporaiton" should read --Corporation--.

3) Column 3, line 61; first word should read --are--.

4) Column 4, line 61; "as" should read --an--.

5) Column 5, line 9; the word between "course" and "porosity" should read --the--.

6) Column 5, small print immediately below Table I; first line after "desired", delete hyphen and substitute a period; second line after "iso", delete period and substitute a hyphen.

7) Column 6, line 1; "delinate" should read --delineate--.

8) Column 6, lines 6, 30 and 36 and column 7, line 66; "DEAE cellulose" should read --DEAE-cellulose--.

9) Column 6, line 12; "CoCl" should read --$CoCl_2$--.

10) Column 6, lines 8 and 68 and column 8, line 26; "Streptomyces" should be in italic print.

11) Column 6, line 40; "absorbed" should read --adsorbed--.

12) Column 7, line 38; "isamerase" should read --isomerase.

Signed and sealed this 8th day of October 1974.

(SEAL)
Attest:

McCOY M. GIBSON JR.
Attesting Officer

C. MARSHALL DANN
Commissioner of Patents